United States Patent [19]

Holz et al.

[11] Patent Number: 4,667,532
[45] Date of Patent: May 26, 1987

[54] METHOD AND APPARATUS FOR CORRECTING THE IMBALANCE OF A TURBOJET ENGINE ROTOR

[75] Inventors: Robert G. Holz, Vert-Saint-Denis; Denis J. N. Vercherin, Laval, both of France

[73] Assignee: Societe Nationale d'Etude et de Construction de Moteurs d'Aviation-"S.N.E.C.M.A.", France

[21] Appl. No.: 704,161

[22] Filed: Feb. 22, 1985

[30] Foreign Application Priority Data

Feb. 22, 1984 [FR] France .................. 84 02646

[51] Int. Cl.⁴ .................................. F16F 15/22
[52] U.S. Cl. ..................... 174/573 R; 464/180
[58] Field of Search ........... 74/573 R, 572; 464/178, 464/179, 180, 183, 184; 73/458, 468, 470

[56] References Cited

U.S. PATENT DOCUMENTS

| | | | |
|---|---|---|---|
| 1,876,526 | 9/1932 | Thearle et al. | 74/573 X |
| 2,426,400 | 8/1947 | Lampton et al. | 74/573 X |
| 2,494,756 | 1/1950 | Gruetjen | 74/573 X |
| 3,128,582 | 4/1964 | Winther | 74/573 X |
| 3,172,303 | 3/1965 | Völler et al. | 74/573 |
| 3,177,738 | 4/1965 | Achilles | 74/573 |
| 3,407,545 | 10/1968 | Imiolczyk | 74/573 X |
| 3,581,596 | 6/1971 | Wespi | 74/573 |
| 3,702,082 | 11/1972 | Decker | 74/573 |
| 3,920,222 | 11/1975 | Brander | 74/573 X |
| 3,940,948 | 3/1976 | Schultehkamper | 74/573 X |
| 3,964,342 | 6/1976 | Beam, Jr. et al. | 74/573 |
| 4,177,692 | 12/1979 | Irwin | 74/573 |
| 4,318,280 | 3/1982 | Williams | 464/180 |
| 4,455,887 | 6/1984 | Lissajoux et al. | 74/573 R |
| 4,539,864 | 9/1985 | Wiebe | 464/180 X |

FOREIGN PATENT DOCUMENTS

| | | |
|---|---|---|
| 1404239 | 5/1965 | France . |
| 1477752 | 3/1967 | France . |
| 1019519 | 2/1966 | United Kingdom . |

*Primary Examiner*—Gary L. Smith
*Assistant Examiner*—Rodney M. Lindsey
*Attorney, Agent, or Firm*—Bacon & Thomas

[57] ABSTRACT

An apparatus for correcting the imbalance of a turbojet engine rotor is disclosed wherein a pair of counterbalanced weights are mounted in the interior of the rotor shaft. The relative positions of the counterbalance weights are mutually adjustable such that any residual imbalances may be counteracted. A tool for adjusting the weights and a method for utilizing the tool are also disclosed.

18 Claims, 10 Drawing Figures

METHOD AND APPARATUS FOR CORRECTING THE IMBALANCE OF A TURBOJET ENGINE ROTOR

FIELD OF THE INVENTION

The invention relates to a method and apparatus for adjusting the position of a pair of counter weights to correct the residual dynamic imbalance of a turbojet engine rotor.

BRIEF DESCRIPTION OF THE PRIOR ART

The individual rotor discs of turbojet engines are each balanced, both dynamically and statically, after manufacturing and prior to installation in the turbojet engine. However, even under such testing, a general imbalance exists in the assembly of the rotor discs after they are placed upon the rotating shaft. These residual imbalances cause vibration in the engine structure, which reduces the operational life of the engine and may produce discomfort to the occupants of an aircraft upon which such engine is utilized. Many devices have been developed over the years to eliminate such residual imbalances, but they often require delicate operation or modification of the equipment in which they are used.

French Patent No. 1,477,752 describes a device which permits the determination of the residual imbalance by using a pair of counterweight masses in a cylindrical case which is temporarily fixed on the rotor web. The counterweight masses are disc sectors rigidly joined to hubs attached to a hollow shaft which ends in a transverse flat surface. The hollow shaft elements of the counterweight masses and a third hollow shaft element fixed to the bottom of the case are mutually coaxial and capable of rotating with respect to each other. The counterweight masses have teeth about their peripheries which are spring biased into engagement with corresponding teeth on the inside wall of the case. Changing the relative angular position between the counterweight masses and the case is achieved by using a tool inserted at the front of the device having three coaxial shafts, one of their ends being provided with connecting members to enable connection to the hollow shaft elements. The angular spacing of the counterweight masses is adjusted so as make the resultant dynamic imbalance equivalent to the residual imbalance, but in an opposite direction so as to cancel the residual imbalance. The curves of the vibration amplitudes are plotted as a function of the resulting dynamic imbalance and of the angles of the counterweight masses, and the magnitude and direction of the residual imbalance is determined. The device is then removed from the turbojet engine and the residual imbalance is eliminated by machining the rotor discs.

French Patent No. 1,404,239 describes a grinding-wheel balancing device which remains attached to the grinding machine. The device comprises two counterbalance weights in the shape of arcuate sectors, each being fixed on a circular disc and housed within the grinder shaft. One of the discs is connected to a spindle assembly which passes coaxially into the hollow shaft of the second disc.

The spindle and shaft extend outwardly from the grinding wheel into a case having three collars and one front plate. The three collars are each provided with gear teeth on their inner circumference cooperating by planetary pinions on a common shaft with pinions respectively fastened on the ends of a sleeve which is rigidly joined to a closing plate for the recess of the grinder shaft, a hollow shaft rigidly attached to the first counterweight, and to a spindle joined to the second counterbalance weight. The imbalance is eliminated by displacing the counterbalance weights with respect to the recess in the grinder shaft by rotating the first collar and then by changing the angular spacing between the counterbalance weights by means of the second and third collars. Such a device, however, cannot be used to eliminate the residual dynamic imbalance of a turbojet engine rotor due to its excessive bulk and the danger of such a device coming out of adjustment when in operation.

SUMMARY OF THE INVENTION

The instant invention provides a method and apparatus for correcting the imbalance of the turbojet engine rotor which eliminates the deficiencies of the prior art devices. The apparatus is of a compact size and is permanently mounted within the turbojet engine rotor shaft near the rotor bearings which must be balanced. The installation and the adjustment of the apparatus may be easily carried out without requiring significant modification or disassembly of the turbojet engine structure.

The apparatus comprises a pair of counterbalance weights, each of the weights being attached to a pair of coaxially aligned sleeves having interengaging ratchet serrations such that relative rotation of the sleeves is permitted in one direction only. Locating means are provided on the sleeves so that the orientation of the respective counterbalance weights may be readily determined. The locating means orients the counterbalance weights generally 180° apart and provides a starting point for their adjustment.

The invention also encompasses a method of adjusting the positions of the counterbalance weights so as to eliminate the residual imbalance and a tool for cooperating with the apparatus in order to carry out the method.

BRIEF DESCRIPTION OF THE DRAWINGS

FIG. 3 is a side view showing the positions of the respective sleeves and their ratchet serrations as utilized in the apparatus according to the invention.

FIG. 4 is a side view similar to that shown in FIG. 3, but with the second and third sleeves in their longitudinally displaced, decoupled positions.

FIGS. 5 and 6 are views taken in the direction of arrows V—V, VI—VI in FIG. 4, respectively.

FIGS. 7A and 7B show the orientations of the imbalance positions of the counterweight sleeves with respect to a pointer indication.

FIG. 8 is a diagrammatic view showing the direction and magnitude of the resultant force to correct the residual imbalance.

DETAILED DESCRIPTION OF THE PREFERRED EMBODIMENT

The invention will be described in relation to a single-body turbojet engine wherein the hollow rotating shaft is comprised of a low pressure portion and a high pressure portion joined together by an internal screw located substantially in the plane of the bearing to be balanced. However, it is understood that the principle set forth herein may be utilized with structures of different types.

Figure 1:
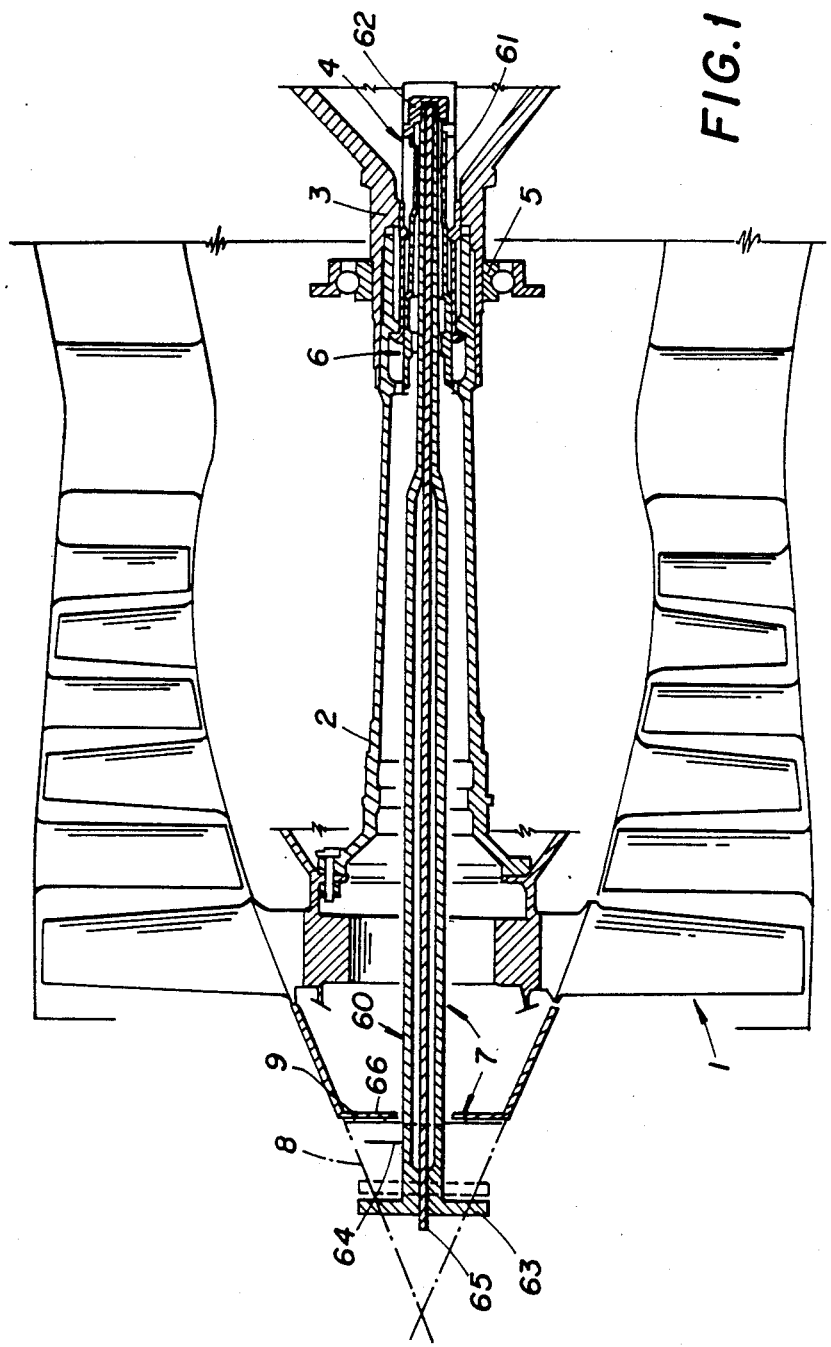
FIG. 1 is a side sectional view of a portion of a turbojet engine provided with the imbalance correcting apparatus according to the invention and the tool for its adjustment.

FIG. 1 shows a section of the low pressure stage 1 of a turbojet engine in which the low pressure portion of the hollow central shaft 2 is rigidly joined to the high pressure portion 3 by coupling shaft 4. The shaft portions 2 and 3 are relatively supported by bearing 5 which is subjected to the residual roor imbalance.

The imbalance correcting apparatus 6 is located within the coupling shaft 4 and may be adjusted by tool 7 inserted upstream through the front of the turbojet engine into the interior of the shaft 2. The tool may be inserted therein following the removal of intake cone 8 which is normally fastened on bracket 9 at the upstream end of the turbojet engine.

Figure 2:
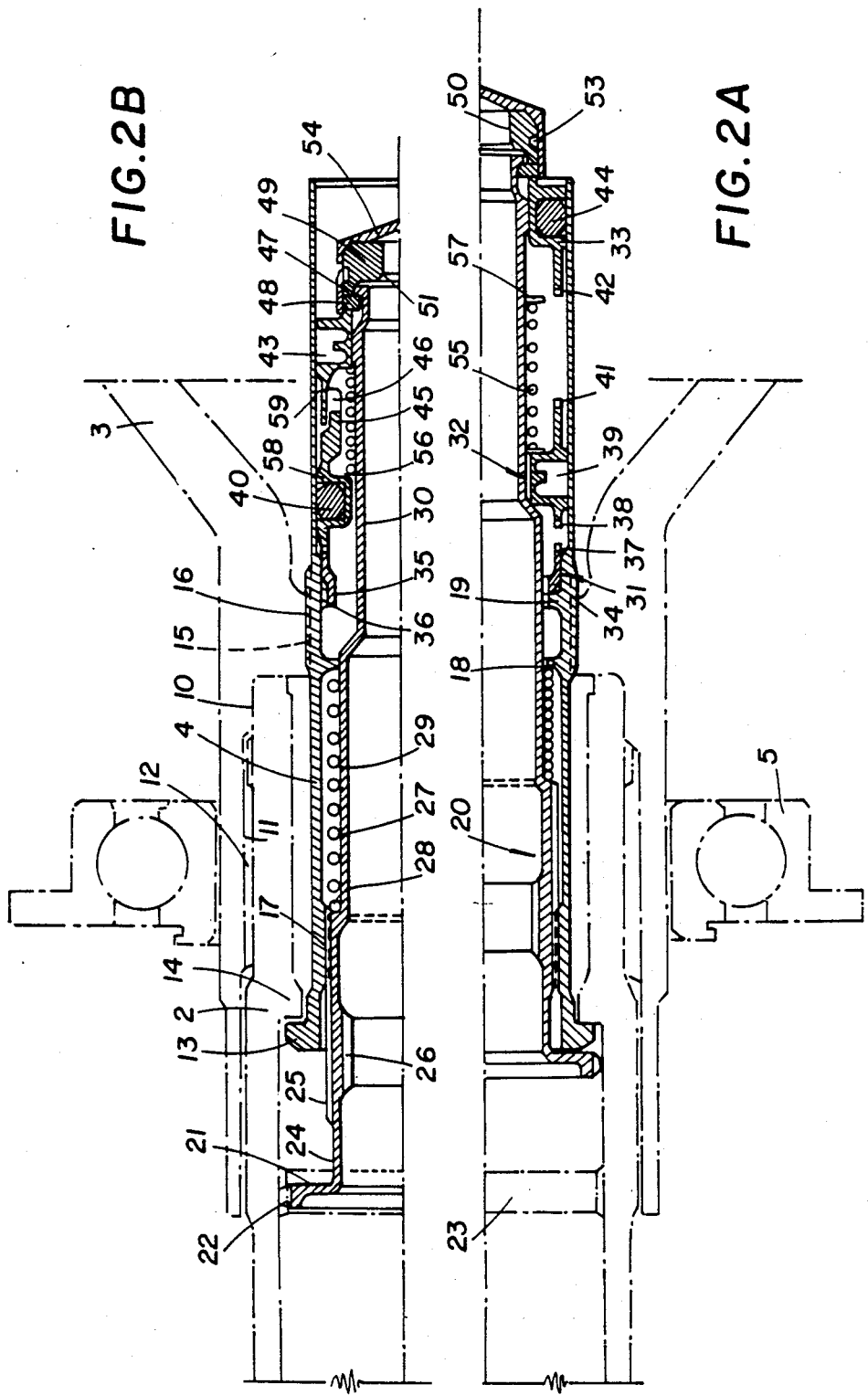
FIG. 2A is a partial, sectional view of the imbalance correcting apparatus shown in FIG. 1 during its initial assembly.
FIG. 2B is a partial, sectional view showing the imbalance correcting apparatus according to the invention in its fully assembled position.

As shown in greater detail in FIGS. 2A and 2B, the upstream end of the high pressure shaft portion 3 defines a recess 10 in which the downstream end of the low pressure shaft portion 2 is housed. The end of the low pressure shaft portion 2 is provided with a spline set 11 which cooperates with corresponding spline set 12 formed in the recess 10 so as to insure the simultaneous rotation of shaft portions 2 and 3.

The shaft portions 2 and 3 are rigidly interconnected by coupling shaft 4 which has upstream shoulder 13 extending radially outwardly therefrom. Shoulder 13 contacts radially inwardly extending shoulder 14, formed on the interior of low pressure shaft portion 2. Coupling shaft 4 is further provided near its middle portion with external threads 15 which cooperatively engage corresponding internal threads 16 formed on the interior surface of high pressure shaft portion 3. By threading coupling shaft 4 into the high pressure shaft portion 3 via threads 15 and 16, the low pressure shaft portion 2 is retained within recess 10 due to the contact between corresponding radial flanges 13 and 14. Thus, the downstream end of low pressure shaft portion 2 bottoms out in the recess 10 by the rotating of coupling shaft 4. This prevents the longitudinal movement of shaft portion 2 with respect to shaft portion 3, while the inter-engaging splines 11 and 12 prevent any relative rotational movement. Thus, the shaft portions 2 and 3 are rigidly locked together.

The coupling screw 4 has a hollow interior to accommodate the imbalance correcting apparatus and the adjusting tool according to the invention. As shown in FIGS. 2A and 2B, coupling shaft 4 has spline set 17 formed on its interior surface near its upstream end and has two radially inwardly extending shoulders 18 and 19 formed near its middle portion.

Locking shaft 20 fits within coupling shaft 4 and has radially outwardly extending flange 21, with teeth 22 formed on its periphery, formed at its upstream end. Teeth 22 cooperate with teeth 23 provided on the inner surface of low pressure shaft portion 2, as shown in FIG. 2B, to prevent relative rotation of the locking shaft 20 with respect to shaft portion 2. The larger diameter portion 24 of locking shaft 20 is located near its upstream end defines external splines 25 and internal splines 26. External splines 25 cooperate with splines 17 formed on the inner surface of coupling shaft 4, while internal splines 26 cooperate with the adjusting tool (to be described in more detail hereinafter) to provide the adjusting torque.

A second portion 27 of locking shaft 20 has a reduced diameter of sufficient dimension to slide through the openings defined by flanges 18 and 19 on the coupling shaft 4. The radial wall 28, formed at the juncture of portion 27 with portion 24 provides a radial bearing surface for one end of helical compression spring 29. As noted, the opposite end of spring 29 bears against the upstream radial face of flange 18. Thus, it can be seen that compression spring 29 exerts a force on the locking shaft 20 urging it toward the upstream direction to a position shown in FIG. 2B. In this position, teeth 22 and 23 are in engagement.

The downstream portion 30 of locking shaft 20 is of a smaller diameter than portion 27 and has the sleeves 31, 32, and 33 mounted thereon. The sleeves are shown in more detail in FIGS. 3 and 4. Sleeves 31, 32, and 33 are coaxially aligned and have similar diameters. The first sleeve 31 has an upstream edge 34 resting against the downstream face of flange 19. Longitudinally extending tongue 35, attached to sleeve 31, engages a notch 36 formed in flange 19 which prevents the rotation of sleeve 31 with respect to coupling shaft 4. The downstream edge of sleeve 31 is formed with ratchet serrations 37 as noted in FIGS. 3 and 4.

Second sleeve 32 is slidably retained on portion 30 of the locking shaft and has an upstream edge formed with ratchet serrations 38 correspondingly shaped to serrations 37. The serrations 37 and 38 are formed so as to permit relative rotation between sleeves 31 and 32 in a first direction, but prohibit such relative movement in the opposite direction. As noted in FIG. 3, when viewed in the direction of arrow 67, sleeve 32 may move counter clockwise with respect to sleeve 31, but no relative movement in the clockwise direction is permitted. Sleeve 32 also has ratchet serrations 41 formed on its downstream edge, these serrations being oppositely oriented to serrations 38.

Sleeve 33 has ratchet serrations 42 formed on its upstream edge which collaborate with serrations 41 formed on sleeve 32. As viewed in the direction of arrow 67, these serrations permit relative movement between sleeves 32 and 33 when sleeve 33 is moved in the clockwise direction, but prohibit relative movement in the opposite direction. Thus, when sleeve 33 is rotated counter clockwise, it also serves to rotate sleeve 32 in this direction, which rotation is permitted by serrations 37 and 38. When sleeve 33 is rotated clockwise, such rotation of sleeve 32 is prohibited by serrations 37 and 38.

As noted in FIGS. 2A and 2B, the sleeve 32 may define a generally "U"-shaped groove 39 extending about its periphery. Counterweight 40, of arcuate shape, is mounted in groove 39. Similarly, the outer surface of sleeve 33 may define a "U"-shaped groove 43 into which counterweight 44 is mounted.

The downstream portion of sleeve 32 and the upstream portion of sleeve 33 have location means thereon to locate sleeve 33 with respect to sleeve 32 such that the counterbalance weights are in a predetermined orientation with respect to each other. The location means may consist of studs 45 and 46, attached to sleeves 32 and 33, respectively.

When studs 45 and 46 contact each other by the relative rotation of sleeves 33 and 32 the counterbalance weights 40 and 44 may be disposed approximately 180° from each other.

Downstream sleeve 33 also defines cutout portions 47 which receive key sectors 48 to axially lock sleeve 33 onto locking shaft 20. The end portion 49 defines internal flat surface 50 and is attached to end of locking shaft 20. Cap 54 is retained on end portion 49 by crimping tongues formed on the cap 54 into groove 53 formed on the external surface of end portion 49. End portion 49 also defines conical surface 51 to act as a guide surface for the end of the adjusting tool.

Second helical compression spring 55 is located about the periphery of section 30 of locking shaft 20 and extends between rings 56 and 57 between sleeves 32 and 33. The force generated by second spring 55 is approximately one-half that developed by compression spring 29. The primary function of spring 55 is to facilitate the longitudinal separation of sleeves 32 and 33 by the adjusting tool.

The elements of the imbalance correcting apparatus are mounted as follows on the coupling shaft 4:

sleeve 31 is inserted from the downstream direction onto the coupling shaft 4 such that tongue 35 engages notch 36 in flange 19:

locking shaft 20 is inserted into the coupling shaft 4 from the upstream direction with compression spring 29 previously located about portion 27, such that splines 25 engage corresponding splines 17 and flange 21 is pushed against shoulder 13 of coupling shaft 4:

sleeve 32, ring 56, spring 55, ring 57, and sleeve 33 are slipped over downstream portion 30 of locking shaft 20:

key sectors 48 are inserted so as to lock sleeve 33 axially onto locking shaft 20, following which end portion 49 and cap 54 are installed.

This entire assembly is then inserted through the upstream opening of the low pressure shaft portion 2 utilizing a tool having splines which engage corresponding splines 26 formed on locking shaft 20. The tool compresses spring 29 such that teeth 22 and 23 are out of engagement thereby permitting rotation of locking shaft 20 and coupling shaft 4. By rotating coupling shaft 4, threads 15 and 16 are engaged until flange 13 contacts flange 14. As noted above this serves to lock the shaft portions 2 and 3 together. Spring 29 then moves locking shaft 20 in an upstream direction such that teeth 22 and 23 engage to prevent further rotation which could result in the uncoupling of the shaft portions.

Figures 3, 4, 5, 6, 7A, 7B, 8:
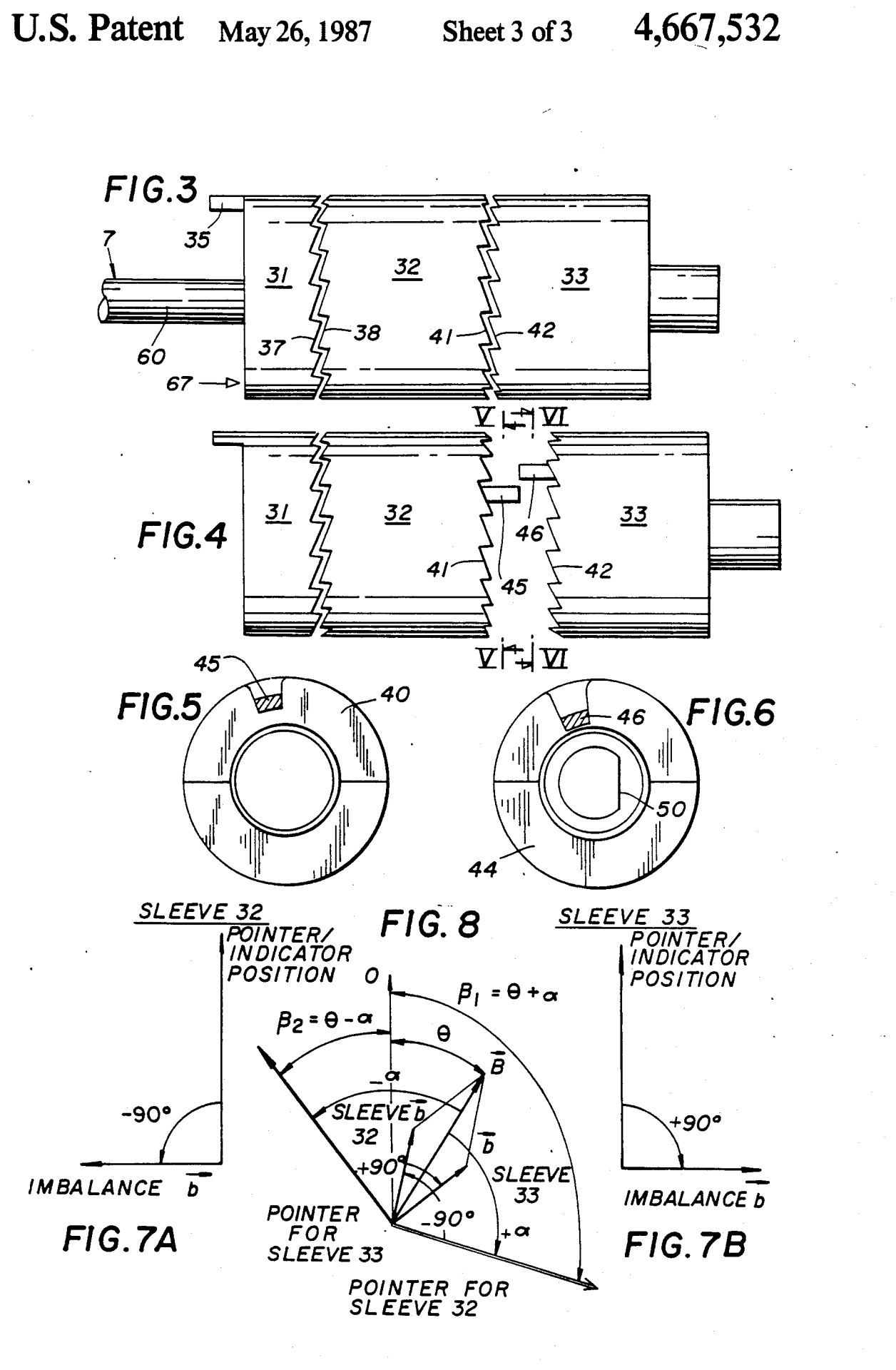

The principle utilized in correcting the residual imbalance $B_r$ is generally known and comprises generating an oppositely directed dynamic imbalance of the same magnitude. The magnitude and direction of the residual imbalance can be determined utilizing known procedures, such as that described in French Patent No. 1,477,752. This imbalance is defined as a vector having a magnitude $\vec{B}$ and a direction $\theta$ with respect to a reference direction. The counterbalance weights 40 and 44 fixed to the sleeves 32 and 33, respectively, each generate dynamic imbalances $\vec{b}$ which, as shown in FIG. 8, can be represented in magnitude and direction by vectors $\vec{b}$. These two vectors are combined to obtain a resultant vector $\vec{B}$ which is equal in magnitude, but opposite in direction to the vector $\vec{B_r}$ of the existing residual imbalance.

Since counterbalance weights 40 and 44 have the same mass the vectors b which represent them are located at $+\alpha$ degrees and $-\alpha$ degrees from the resultant vector $\vec{B}$ in the relation $2\vec{b} \cos \alpha = \vec{B}$. Since B and b are known, it follows that $\alpha = \arccos(B/2b)$. Accordingly, the counterbalance weights must be moved in the directions $\beta_1 = \theta + \alpha$ and $\beta_2 = \theta - \alpha$.

To carry out the method of orienting the counterbalance weights, tool 7, shown in FIG. 1 is utilized. Tool 7 includes an elongated shaft 60 having an end portion 61 with a flat surface 62 formed thereon which engages the flat surface 50 formed on end portion 49 of locking shaft 20. The other end of elongated shaft 60 has radially extending collar 63 formed thereon to facilitate the manual application of torque to the elongated shaft. Locating pointer 64 is attached to the elongated shaft 60 and extends generally in a radial direction therefrom. The pointer 64 is located on the shaft 60 such that it is near graduated scale 66 which attached to fastening strap 9 of intake cone 8.

Thus, by inserting the elongated shaft into the interior of low pressure portion 2, locking shaft 20 such that the end engages flat surface 50, a rotating torque may be applied to the counterbalance weight sleeve, as well as a longitudinal force applied to sleeve 33. In order to insure that the end 61 is fully engaged with the locking shaft 20, a check rod 65 may be utilized. Check rod 65 has a length exceeding that of the elongated shaft so as to extend beyond the radial flange 63. Upon insertion of check rod 65, should the upstream end not protrude beyond the radial flange 63, it can be assumed that the end 61 of shaft 60 is not fully engaged with the locking shaft 20. However, should this end extend a predetermined distance beyond the flange 63, it indicates the proper engagement of the tool with the locking shaft.

FIG. 3 shows a side view of the sleeves 31, 32, and 33 on the locking shaft 20 when this shaft is in the position shown in FIG. 2B and the tool 7 is inserted therein. As previously noted, due to the shape of the ratchet serrations, the ratchet teeth can only slip past each other in a single direction. When the elongated shaft 60 is rotated in a clockwise direction, as viewed in the direction of arrow 67, rotation takes place between ratchet serrations 41 and 42 such that only sleeve 33 rotates with respect to sleeves 31 and 32. Conversely, when the elongated shaft is rotated in a counter clockwise direction, also viewed in the direction of arrow 67, serrations 37 and 38 are caused to slip and sleeves 32 and 33 are rotated in the counter clockwise direction.

To properly locate the counterbalance weights 40 and 44 in their initial, opposed positions, elongated shaft 60 is rotated clockwise (viewed in the direction of arrow 67) to rotate sleeve 33 with respect to sleeve 32 until studs 45 and 46 come into contact with each other. This properly locates the counterbalance weights in their opposed positions.

The angles are measured between 0° and 360° in the clockwise direction, 0° then being opposite the referenced direction. Therefore, during the adjustment, the imbalance positions of the sleeves 32 and 33 are each located 90° from the pointer 64, as indicated in FIGS. 7A and 7B. To properly locate the imbalances $\vec{b}$, which are the correction components indicated in FIG. 8, the locating pointer 64 must be rotated through $\beta_1 = \theta + \alpha_1$ to properly position sleeve 32, and through $\beta_2 = \theta - \alpha_1$ to properly orient sleeve 33. The angle $\alpha_1$ of these equations is the complement of the angle $\alpha$ previously noted ($\alpha_1 = 90° - \alpha$).

The residual dynamic imbalance of the rotor is corrected as follows:

the correction apparatus is nulled by rotating the elongated shaft 60 clockwise until sleeve 33 is properly positioned with respect to sleeve 32 i.e. studs 45 and 46 are in contact with each other, at which point pointer 64 is aligned with the scale graduation defined as 0:

elongated shaft 64 is rotated counter clockwise until it reaches the angle $\beta_1$. Since the serrations 41 and 42 are locked in position, the rotation of elongated shaft 60 jointly drives the sleeves 32 and 33:

shaft 60 is then rotated slightly in the clockwise direction to check the ratchet serrations for slippage, such rotation not exceeding a few degrees:

a longitudinal force is applied to collar 63 so as to push elongated shaft 60 against the end portion 49 and thereby displace sleeve 33 away from sleeve 32, as shown in FIG. 4:

shaft 60 is then rotated in a clockwise direction through an angle of approximately 45° to move the stud 46 of sleeve 33 to the opposite side of stud 45 of sleeve 32:

the longitudinal force is released to thereby engage the serrations 41 and 42:

the shaft 60 is then rotated in a clockwise direction through an angle of $\beta_2$.

Once the counterbalance weights 40 and 44 are thus positioned, the imbalance correction is completed, and the elongated shaft 60 and graduated scale 66 may be removed from the turbojet engine.

The foregoing is provided for illustrative purposes only and should not be construed as in anyway limiting this invention, the scope of which is defined solely by the appended claims.

We claim:

1. Apparatus for correcting the imbalance of a turbojet engine rotor having a hollow rotating shaft comprising:
   (a) a first sleeve fixed so as to rotate with the shaft about a longitudinal axis, the first sleeve having axially facing first ratchet teeth means extending about an edge, one side of each tooth extending generally parallel to the longitudinal axis;
   (b) a second sleeve coaxially aligned with the first sleeve, the second sleeve having second axially facing ratchet teeth means extending about a first edge, one side of each tooth extending generally parallel to the longitudinal axis, the second ratchet teeth means engaging the first ratchet teeth means of the first sleeve such that relative rotation between the first and second sleeves is permitted in a first direction, but prohibited in an opposite, second direction, and third axially facing ratchet teeth means extending about a second edge, one side of each tooth extending generally parallel to the longitudinal axis;
   (c) a third sleeve coaxially alligned with the first and second sleeves, the third sleeve having fourth axially facing ratchet teeth means extending about an edge, one side of each tooth extending generally parallel to the longitudinal axis, the fourth ratchet teeth means engaging the third axially facing ratchet teeth means of the second sleeve such that relative rotation between the second and third sleeves is prohibited in the first direction, but permitted in the second direction;
   (d) biasing means to bias the second sleeve toward the first sleeve such that the first and second ratchet teeth means are in engagement and to bias the third sleeve toward the second sleeve such that the third and fourth ratchet teeth means are in engagement;
   (e) a first counterweight eccentrically mounted on the second sleeve;
   (f) a second counterweight eccentrically mounted on the third sleeve; and,
   (g) means to adjust the circumferential positions of the first and second counterweights to correct the imbalance of the rotor.

2. The apparatus according to claim 1 further comprising locating means on the second and third sleeves to indicate a predetermined relative position of the first and second counterweights.

3. The apparatus according to claim 2 wherein the locating means comprises: a first stud attached to the second sleeve and extending toward the third sleeve; and, a second stud attached to the third sleeve and extending toward the second sleeve such that, when the studs are in contact with each other, the counterweights are in predetermined positions.

4. The apparatus according to claim 3 wherein the first and second counterweights are approximately equal in weight and are disposed approximately equal distances from the rotational axis of the rotating shaft.

5. The apparatus according to claim 4 wherein centers of the counterweights are displaced approximately 180° from each other when the first and second studs are in contact with each other.

6. The apparatus according to claim 5 wherein the outer circumference of the second sleeve defines a generally U-shaped groove and wherein the first counterweight is mounted in the groove.

7. The apparatus according to claim 6 wherein the outer circumference of the third sleeve also defines a generally U-shaped groove and wherein the second counterweight is mounted in the groove.

8. The apparatus according to claim 2 wherein the hollow rotating shaft has an upstream low-pressure portion and a downstream high-pressure portion and further comprising:
   (a) a hollow coupling shaft engaging interior parts of the low-pressure and high-pressure portion so as to retain them in assembled relationship; and,
   (b) a locking shaft slidingly retained in the hollow coupling shaft, the locking shaft having a reduced diameter portion on which the first, second and third sleeves are mounted.

9. The apparatus according to claim 8 where in the biasing means are disposed between the hollow coupling shaft and the locking shaft.

10. The apparatus according to claim 9 wherein the third sleeve is attached to the locking shaft such that they move in a longitudinal direction together.

11. The apparatus according to claim 10 wherein the biasing means comprises:
    (a) a first compression spring between the hollow coupling shaft and the locking shaft exerting of first force on the locking shaft urging it toward a first direction in which the ratchet serrations on the first, second and third sleeves are in contact; and,
    (b) a second compression spring between the second and third sleeve exerting a second force on the locking shaft urging it in an opposite, second direction, the second force being less than the first force.

12. The apparatus according to claim 11 wherein the second force is approximately one-half the first force.

13. The apparatus according to claim 11 wherein the hollow coupling shaft defines a set of splines on a portion of its interior surface and wherein the locking shaft defines a cooperating set of splines on a portion of its external surface, the sets of splines interengaging so as to allow relative longitudinal movement between the coupling shaft and the locking shaft, but prevent relative rotational movement.

14. The apparatus according to claim 13 wherein the locating means comprises: a first stud attached to the second sleeve and extending toward the third sleeve; and, a second stud attached to the third sleeve and extending toward the second sleeve such that, when the studs are in contact with each other, the counterweights are in predetermined positions.

15. The apparatus according to claim 14 wherein the first and second counterweights are approximately equal in weight and are disposed approximately equal distances from the rotational axis of the rotating shaft.

16. The apparatus according to claim 15 wherein centers of the counterweights are displaced approximately 180° from each other when the first and second studs are in contact with each other.

17. The apparatus according to claim 16 wherein the outer circumference of the second sleeve defines a generally U-shaped groove and wherein the first counterweight is mounted in the groove.

18. The apparatus according to claim 17 wherein the outer circumference of the third sleeve also defines a generally U-shaped groove and wherein the second counterweight is mounted in the groove.

* * * * *

UNITED STATES PATENT AND TRADEMARK OFFICE
CERTIFICATE OF CORRECTION

PATENT NO. : 4,667,532

DATED : May 26, 1987

INVENTOR(S) : Holz et al.

It is certified that error appears in the above-identified patent and that said Letters Patent is hereby corrected as shown below:

Column 6, line 22, "we:ght" should be --weight--.

Column 7, line 56, claim 1, "alligned" should be --aligned--.

Column 8, line 48, claim 9, "where in" should be --wherein--.

Signed and Sealed this

Third Day of November, 1987

Attest:

DONALD J. QUIGG

Attesting Officer

Commissioner of Patents and Trademarks